(12) United States Patent
Kiribuchi

(10) Patent No.: US 11,249,461 B2
(45) Date of Patent: Feb. 15, 2022

(54) MOTOR CONTROL DEVICE AND SETTING DEVICE

(71) Applicant: OMRON Corporation, Kyoto (JP)

(72) Inventor: Takeshi Kiribuchi, Osaka (JP)

(73) Assignee: OMRON CORPORATION, Kyoto (JP)

( * ) Notice: Subject to any disclaimer, the term of this patent is extended or adjusted under 35 U.S.C. 154(b) by 85 days.

(21) Appl. No.: 16/644,606

(22) PCT Filed: Jan. 23, 2019

(86) PCT No.: PCT/JP2019/002061
§ 371 (c)(1),
(2) Date: Mar. 5, 2020

(87) PCT Pub. No.: WO2019/176307
PCT Pub. Date: Sep. 19, 2019

(65) Prior Publication Data
US 2021/0064006 A1 Mar. 4, 2021

(30) Foreign Application Priority Data
Mar. 13, 2018 (JP) .............................. JP2018-045658

(51) Int. Cl.
*G05B 11/01* (2006.01)
*G05B 19/4155* (2006.01)
(Continued)

(52) U.S. Cl.
CPC ...... *G05B 19/4155* (2013.01); *H02P 23/0027* (2013.01); *H02P 23/14* (2013.01);
(Continued)

(58) Field of Classification Search
CPC ...... H02P 23/0027; H02P 23/14; H02P 31/00; G05B 2219/31368; G05B 2219/33116; G05B 19/054
See application file for complete search history.

(56) References Cited

U.S. PATENT DOCUMENTS 4,137,565 A * 1/1979 Mager ................. G05B 19/054
710/22
6,697,685 B1 * 2/2004 Caldwell ............. G05B 19/042
134/57 D
(Continued)

FOREIGN PATENT DOCUMENTS

CN       101005258 A     7/2007
CN       102868336 A     1/2013
(Continued)

OTHER PUBLICATIONS

An English translation of the International Search Report("ISR") of PCT/JP2019/002061 dated Apr. 2, 2019.
(Continued)

*Primary Examiner* — Muhammad S Islam
(74) *Attorney, Agent, or Firm* — Metrolex IP Law Group, PLLC

(57) ABSTRACT

The present invention allows a communication mode in which to communicate with a detection section to be easily and conveniently changed in a motor control device. A slave device (90) includes: a network communication section (120) configured to communicate with a PLC (100) via a communication network; an FB signal obtaining section configured to obtain an FB signal from a detection section; and a setting communication section (140) configured to receive communication mode information of an FB through another communication path different from the communication network. The FB signal obtaining section includes a reconfigurable device and is capable of changing a communication mode of the FB signal obtaining section by reconfiguring the reconfigurable device. The slave device (90) reconfigures the reconfigurable device in accordance with the communication mode information in a case where the
(Continued)

setting communication section (140) receives the communication mode information.

7 Claims, 5 Drawing Sheets

(51) Int. Cl.
*H02P 23/14* (2006.01)
*H02P 23/00* (2016.01)
(52) U.S. Cl.
CPC ............. *G05B 2219/31368* (2013.01); *G05B 2219/33116* (2013.01)

(56) References Cited

U.S. PATENT DOCUMENTS

| | | | |
|---|---|---|---|
| 2013/0020979 A1* | 1/2013 | Bates | H02P 23/14 318/497 |
| 2017/0094375 A1* | 3/2017 | Yamada | H04L 69/22 |
| 2018/0107170 A1 | 4/2018 | Iwahashi et al. | |
| 2019/0103829 A1* | 4/2019 | Vasudevan | G06F 3/016 |

FOREIGN PATENT DOCUMENTS

| | | |
|---|---|---|
| CN | 205693589 U | 11/2016 |
| EP | 3076542 A1 | 10/2016 |
| JP | H08-205570 A | 8/1996 |
| JP | 2000-330641 A | 11/2000 |
| JP | 2001-117613 A | 4/2001 |
| JP | 2002101680 A | 4/2002 |
| JP | 2017-069777 A | 4/2017 |
| JP | 6123011 B1 | 4/2017 |

OTHER PUBLICATIONS

The Written Opinion("WO") of PCT/JP2019/002061 dated Apr. 2, 2019.
The Written Opinion of the International Preliminary Examining Authority ("IPEA/408") of PCT/JP2019/002061 dated Sep. 17, 2019.
An extended European search report (EESR) dated Oct. 27, 2021 in a counterpart European patent application.

* cited by examiner

MOTOR CONTROL DEVICE AND SETTING DEVICE

TECHNICAL FIELD

An aspect of the present invention relates to a motor control device for controlling a motor.

BACKGROUND ART

In an industrial system such as a factory automation (FA), various ideas for a technique for setting a condition under which devices operate have been proposed. For example, Patent Literature 1 discloses a technique for changing a communication mode of a communication processor in accordance with a command from a host device.

CITATION LIST

Patent Literature

[Patent Literature 1]
Japanese Patent Application Publication Tokukai No. 2017-69777

SUMMARY OF INVENTION

Technical Problem

An aspect of the present invention has an object to easily and conveniently change, in a motor control device, a communication mode in which to communicate with a detection section configured to detect a predetermined physical quantity corresponding to an operating state of a motor.

Solution to Problem

In order to attain the object, a motor control device in accordance with an aspect of the present invention is a motor control device for controlling a motor, the motor control device including: a network communication section configured to communicate, via a communication network, with a master device, which is a host device with respect to the motor control device; a feedback signal obtaining section configured to obtain, from a detection section configured to detect a predetermined physical quantity corresponding to an operating state of the motor, a feedback signal indicative of the predetermined physical quantity; and a setting communication section configured to receive communication mode information of the feedback signal obtaining section through another communication path different from the communication network, the feedback signal obtaining section including a reconfigurable device and being capable of changing a communication mode of the feedback signal obtaining section by reconfiguring the reconfigurable device, and the motor control device reconfiguring the reconfigurable device in accordance with the communication mode information in a case where the setting communication section receives the communication mode information.

In order to attain the object, a setting device in accordance with an aspect of the present invention is a setting device for setting an operation condition of a motor control device, the motor control device including: a network communication section configured to communicate, via a communication network, with a master device, which is a host device with respect to the motor control device; and a feedback signal obtaining section configured to obtain, from a detection section configured to detect a predetermined physical quantity corresponding to an operating state of a motor, a feedback signal indicative of the predetermined physical quantity, the feedback signal obtaining section including a reconfigurable device and being capable of changing a communication mode of the feedback signal obtaining section by reconfiguring the reconfigurable device, the setting device including: a setting section configured to set communication mode information of the feedback signal obtaining section, the setting device supplying the communication mode information to the motor control device through another communication path different from the communication network.

Advantageous Effects of Invention

An aspect of the present invention makes it possible to easily and conveniently change a communication mode in which to communicate with a detection section.

DESCRIPTION OF EMBODIMENTS

Embodiment 1

An embodiment in accordance with an aspect of the present invention (hereinafter also referred to as "Embodiment 1 or 2") is described below with reference to the drawings.

§ 1 Application Example

Figure 1:
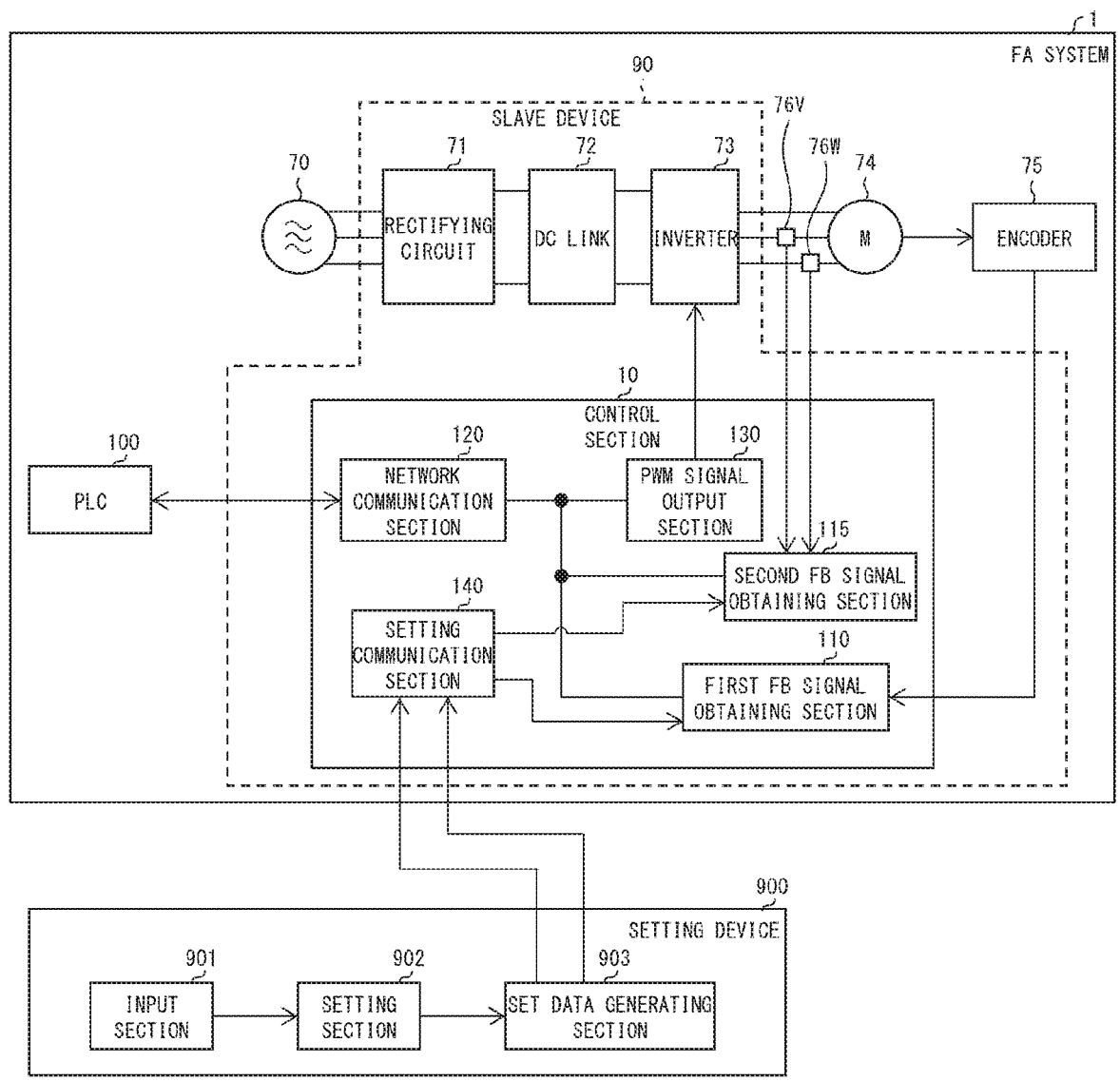
FIG. 1 is a view illustrating a configuration of a main part of an FA system and a setting device of Embodiment 1.

FIG. 1 is a view illustrating a configuration of a main part of a factory automation (FA) system 1 (motor control system) and a setting device 900 of Embodiment 1. The FA system 1 includes at least one slave device 90 (motor control device) and a programmable logic controller (PLC) 100 (master device). The PLC 100 is an example of a host device (master device) with respect to the at least one slave device 90.

The FA system 1 further includes an electric power source 70 and a motor 74. The at least one slave device 90 includes a control section 10 configured to control the motor 74. The control section 10 includes a network communication section 120 configured to communicate with the PLC 100 via a communication network (e.g., a communication network of the FA system 1). The FA system 1 also includes a detection section configured to detect a predetermined physical quantity corresponding to an operating state of the motor 74. For example, the FA system 1 includes, as the detection section, an encoder 75 (a first detection section) and electric current detectors 76V and 76W (a second detection section).

The control section 10 further includes an FB signal obtaining section (feedback signal obtaining section) configured to obtain a feedback (FB) signal from the detection section. For example, the FA system 1 includes, as the FB signal obtaining section, a first FB signal obtaining section 110 (first feedback signal obtaining section) and a second FB signal obtaining section 115 (second feedback signal obtaining section).

Embodiment 1 describes an example of a case where the FB signal obtaining section includes the first FB signal obtaining section 110 and the second FB signal obtaining section 115. That is, Embodiment 1 describes an example of a case where the first FB signal obtaining section 110 and the second FB signal obtaining section 115 are used to carry out feedback control with respect to the motor 74. Thus, the FB signal is assumed to include a first FB signal and a second FB signal each described later.

Note, however, that the FB signal obtaining section can be alternatively constituted by either the first FB signal obtaining section 110 or the second FB signal obtaining section 115. That is, the FB signal can alternatively be either the first FB signal or the second FB signal. That is, the detection section can alternatively be either the first detection section or the second detection section.

The FB signal obtaining section includes a reconfigurable device. A communication mode of the FB signal obtaining section can be changed by reconfiguring the reconfigurable device.

The setting device 900 sets an operation condition of the at least one slave device 90. Upon receiving an operation of a user (hereinafter referred to as "a user operation"), the setting device 900 allows the user to set the operation condition of the at least one slave device 90. Specifically, the setting device 900 sets the communication mode of the FB signal obtaining section.

The setting device 900 includes an input section 901, a setting section 902, and a set data generating section 903 (generating section). The input section 901 receives the user operation. The setting section 902 sets one of a plurality of types of the communication mode of the FB signal obtaining section in accordance with the user operation.

The control section 10 further includes a setting communication section 140. The setting communication section 140 receives communication mode information of the FB signal obtaining section through another communication path different from the communication network. For example, the setting communication section 140 obtains the communication mode information from the setting device 900. In a case where the setting communication section 140 receives the communication mode information, the at least one slave device 90 (more specifically, the control section 10) reconfigures the reconfigurable device in accordance with the communication mode information. For example, the setting communication section 140 reconfigures the reconfigurable device in accordance with the communication mode information received. Note, however, that a functional section, different from the setting communication section 140, of the control section 10 can be alternatively provided with a function of reconfiguring the reconfigurable device.

The configuration allows a communication mode suitable for the at least one slave device 90 to be freely changed in accordance with a specification of the detection section. That is, unlike a conventional technique, the configuration makes it unnecessary to prepare, in accordance with a specification of the detection section, the at least one slave device 90 for which a single specific communication mode is set in advance. Thus, a single slave device 90 can be set so as to communicate with detection sections that vary in specification.

Furthermore, the setting communication section 140 obtains the communication mode information through another communication path different from the communication network. Thus, for example, the at least one slave device 90 can obtain the communication mode information from the setting device 900 through the another communication path. For example, the at least one slave device 90 can communicate with the setting device 900 through a wired or wireless communication path that is not included in the communication network. This makes it possible to easily change a relationship in which the setting device 900 and the at least one slave device 90 are connected. This allows the user to easily and conveniently set the motor control device at a site (e.g., in a factory) where the motor control device is provided. As described earlier, according to the at least one slave device 90, it is possible to easily and conveniently change a communication mode in which to communicate with the detection section.

§ 2 Configuration Example (Overview of FA System 1)

Figure 2:
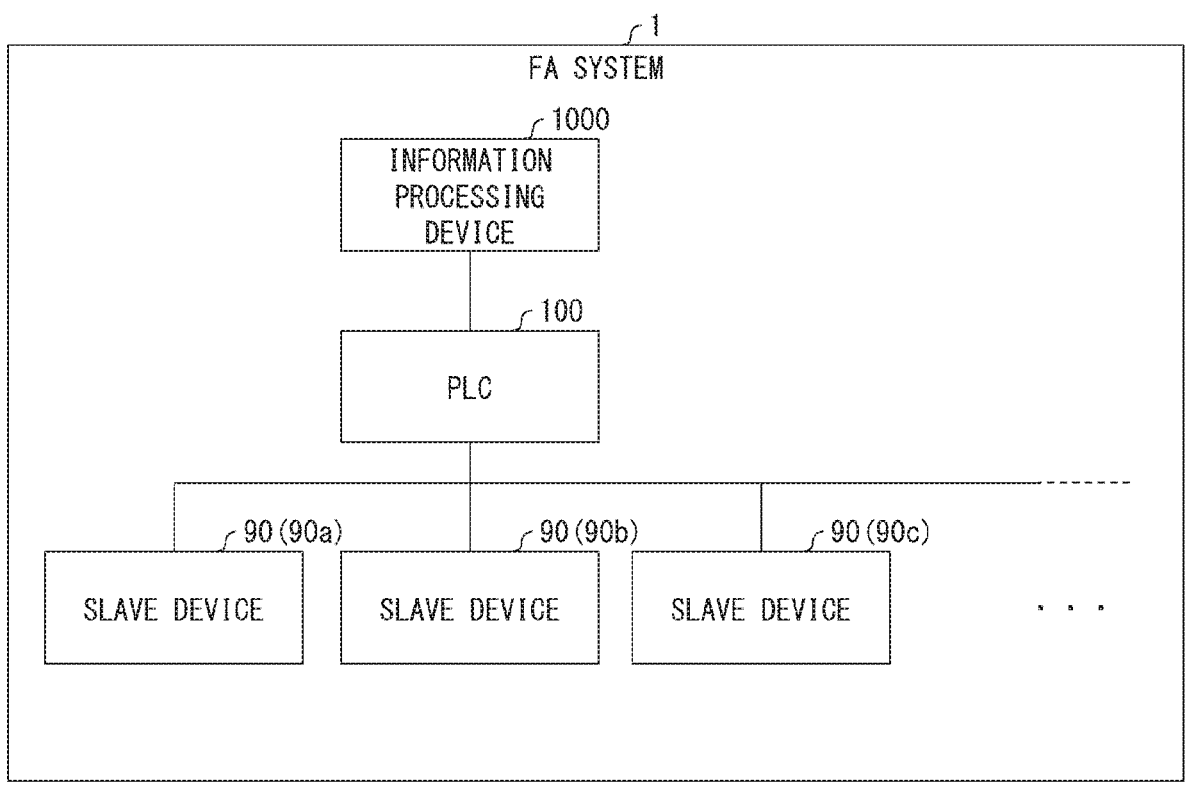
FIG. 2 is a functional block diagram schematically illustrating an overall configuration of the FA system of FIG. 1.

FIG. 2 is a functional block diagram schematically illustrating an overall configuration of the FA system 1. The FA system 1 includes an information processing device 1000, the PLC 100, and the at least one slave device 90. The FA system 1 is a unit obtained by integrating, as a functional unit, production facilities including a plurality of machines provided in a factory. The FA system 1 is a system that achieves automation of a factory production process. The FA system 1 is achieved by a master-slave control system.

In the FA system 1, the PLC 100 (master device) can be referred to as a network master. In contrast, the at least one slave device 90 can be referred to as a network slave. The PLC 100 controls the at least one slave device 90.

The information processing device 1000 collectively controls sections of the FA system 1. The information processing device 1000 can control the PLC 100. The PLC 100 can supply data to each of the at least one slave device 90. The PLC 100 can also obtain data from each of the at least one slave device 90. Note that an industrial PC platform (IPC) can be used as the information processing device 1000 or the PLC 100.

Each of the at least one slave device 90 is connected to the information processing device 1000 via the PLC 100. Each of the at least one slave device 90 carries out, at a command from the PLC 100, one or more functions related to a production process. For convenience, three slave devices 90 illustrated in FIG. 2 are also referred to as respective slave devices 90a to 90c. The information processing device 1000 can control the slave devices 90a to 90c via the PLC 100. The slave devices 90a to 90c communicate with each other via the PLC 100. FIG. 2 illustrates a case where the at least one slave device 90 comprises a plurality of slave devices 90. Note, however, that the at least one slave device 90 can be a single slave device 90.

(Example of Circuit Configuration)

Figure 3:
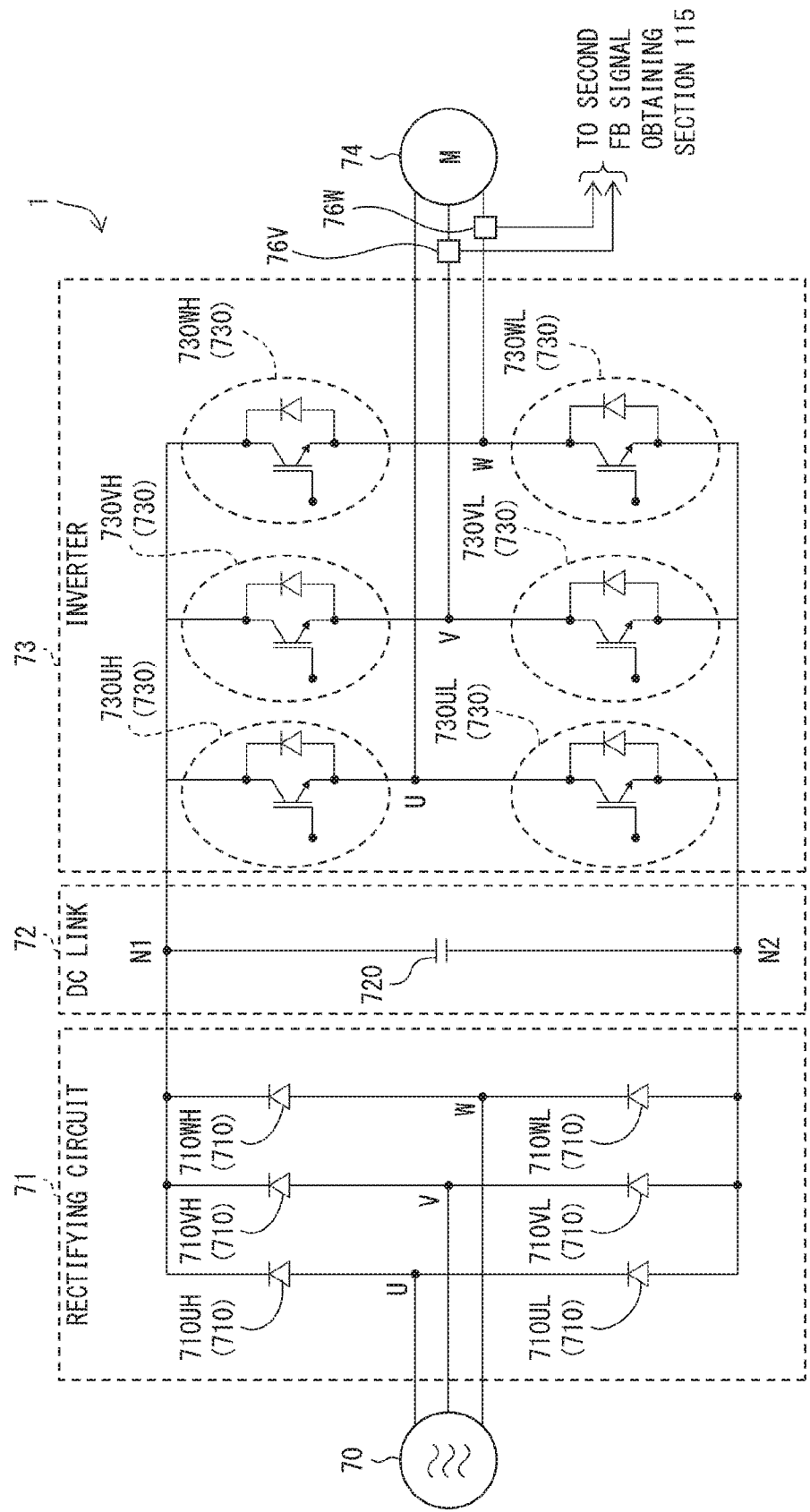
FIG. 3 is a view illustrating an example of a circuit configuration of a slave device of FIG. 1 between an electric power source and a motor.

FIG. 3 is a view illustrating an example of a circuit configuration between the electric power source 70 and the motor 74 in the FA system 1. The at least one slave device 90 includes a rectifying circuit 71, a direct current (DC) link 72, and an inverter 73 (electric power converting section).

The control section 10 supplies, to the inverter 73, a motor driving signal (e.g., a pulse width modulation (PWM) signal) for causing the inverter 73 to drive the motor 74. The inverter 73 drives the motor 74 in accordance with the PWM signal. The control section 10 thus controls (drives) the motor 74 via the inverter 73.

The following description discusses an example of a case where the motor 74 is a three-phase alternating current (alternative current, AC) induction motor (IM). Note, however, that the motor 74 can alternatively be a three-phase alternating current synchronous motor (SM). Alternatively, the motor 74 can be a single-phase or two-phase alternating current motor. Further alternatively, the motor 74 can be a direct current motor.

The electric power source 70 is a publicly known three-phase alternating current power source. The following description denotes phases of a three-phase alternating current as a U-phase, a V-phase, and a W-phase, respectively. The electric power source 70 is connected to the rectifying circuit 71. The rectifying circuit 71 includes six rectifying elements 710. For example, the rectifying elements 710 are each a diode. By rectifying an alternating current voltage (alternating current power) supplied from the electric power source 70, the rectifying circuit 71 converts the alternating current voltage into a direct current voltage (direct current power). The rectifying circuit 71 serves as an AC/DC converter.

The six rectifying elements 710 constitute a three-phase full-wave rectifying circuit. Of the six rectifying elements 710, (i) two rectifying elements 710 are each connected to the U-phase of the electric power source 70, (ii) two rectifying elements 710 are each connected to the V-phase of the electric power source 70, and (iii) two rectifying elements 710 are each connected to the W-phase of the electric power source 70.

In FIG. 3, the six rectifying elements 710 are also referred to as follows:
rectifying element 710 UH (U-phase upper arm rectifying element)
rectifying element 710 UL (U-phase lower arm rectifying element)
rectifying element 710 VH (V-phase upper arm rectifying element)
rectifying element 710 VL (V-phase lower arm rectifying element)
rectifying element 710 WH (W-phase upper arm rectifying element)
rectifying element 710 WL (W-phase lower arm rectifying element)

Note that the term "upper arm rectifying element" generically refers to a rectifying element 710 connected to a node N1 of the DC link 72 (a capacitor 720). Note also that the term "lower arm rectifying element" generically refers to a rectifying element 710 connected to a node N2 of the DC link 72. Meanings of the terms "upper arm" and "lower arm" also apply to the inverter 73 (described later).

The rectifying circuit 71 is connected to the inverter 73 via the DC link 72. The DC link 72 includes the capacitor 720. The capacitor 720 has two nodes one and the other one of which are referred to as N1 and N2, respectively. The capacitor 720 smooths a direct current voltage supplied from the rectifying circuit 71. In the circuit configuration of FIG. 3, (i) the node N1 corresponds to a positive electrode of the capacitor 720, and (ii) the node N2 corresponds to a negative electrode of the capacitor 720. The DC link 72 can be alternatively referred to as a smoothing circuit.

The inverter 73 includes six switching elements 730. Embodiment 1 describes an example of a case where the inverter 73 is a voltage inverter. Note, however, that the inverter 73 can alternatively be an electric current inverter. By switching a direct current voltage (direct current power) supplied from the DC link 72, the inverter 73 converts the direct current voltage into an alternating current voltage (alternating current power). The inverter 73 serves as a DC/AC converter.

The switching elements 730 are configured such that an insulated gate bipolar transistor (IGBT) and a diode (reflux diode) are connected in parallel. Of the six switching elements 730, (i) two switching elements 730 are each connected to the U-phase of the motor 74, (ii) two switching elements 730 are each connected to the V-phase of the motor 74, and (iii) two switching elements 730 are each connected to the W-phase of the motor 74. "The U-phase of the motor 74" more precisely means "the U-phase of a stator winding of the motor 74". This point also applies to each of the V-phase and the W-phase.

In FIG. 3, the six switching elements 730 are also referred to as follows:
switching element 730 UH (U-phase upper arm switching element)
switching element 730 UL (U-phase lower arm switching element)
switching element 730 VH (V-phase upper arm switching element)
switching element 730 VL (V-phase lower arm switching element)
switching element 730 WH (W-phase upper arm switching element)
switching element 730 WL (W-phase lower arm switching element)

The inverter 73 supplies, to the motor 74, the voltage (alternating current voltage), into which the direct current voltage has been converted. By providing the inverter 73, it is possible to supply, to the motor 74, a three-phase alternating current voltage having a desired wave form (e.g., a three-phase alternating current voltage having a desired frequency and a desired amplitude). Thus, it is possible to control operation of the motor 74 by controlling operation of the inverter 73 (ON (electrical conduction)/OFF (disconnection) of each of the six switching elements 730). That is, the motor 74 can be driven under a desired operating condition. According to Embodiment 1, the motor 74 is driven by PWM control.

(Example of Method for Controlling Motor 74)

The encoder 75 is provided (e.g., attached) to the motor 74. The encoder 75 is, for example, a rotary encoder. The encoder 75 detects a position of the rotor of the motor 74 (more specifically, a rotation angle of the motor 74) (hereinafter denoted as "Om"). "A rotation angle of the motor 74" more precisely means "a rotation angle of the rotor of the motor 74". Om is an example of a predetermined physical quantity corresponding to the operating state of the motor 74. The encoder 75 outputs a signal indicative of Om (hereinafter referred to as an "angle detecting signal"). The angle detecting signal is, for example, a serial data signal (digital data). The encoder 75 thus outputs the angle detecting signal in a form of a signal indicative of numeric data.

The first FB signal obtaining section 110 obtains, from the encoder 75, the angle detecting signal serving as a first FB signal. Specifically, the first FB signal obtaining section 110 obtains the first FB signal (angle detecting signal) from the encoder 75 at every predetermined cycle (communication cycle). The first FB signal obtaining section 110 is used for, for example, position feedback.

The first FB signal obtaining section 110 communicates with (receives data from) the encoder 75 in a first communication mode. The first communication mode can be a publicly known serial communication mode. Embodiment 1 describes an example of a case where the first communication mode is RS422. Note, however, that the first communication mode can be another serial communication mode such as RS485. The first FB signal obtaining section 110 thus configured carries out a digital process for obtaining the first FB signal.

The second FB signal obtaining section 115 obtains, via the respective electric current detectors 76V and 76W, signals each indicating an electric current supplied from the inverter 73 to the motor 74, i.e., an electric current supplied from the at least one slave device 90 to the motor 74 (hereinafter referred to as "electric current detecting signals"). The electric current is another example of the predetermined physical quantity corresponding to the operating state of the motor 74. For example, the second FB signal obtaining section 115 detects, via the electric current detectors 76V and 76W, electric currents supplied from the inverter 73 to respective predetermined two phases (e.g., the V-phase and the W-phase) of the motor 74 (see FIGS. 1 and 3).

The electric current detector 76V detects an electric current supplied from the inverter 73 to the V-phase of the motor 74. The electric current detector 76W detects an electric current supplied from the inverter 73 to the W-phase of the motor 74. The electric current detectors 76V and 76W supply, to the second FB signal obtaining section 115, their respective detection results in a form of electric current detecting signals.

Embodiment 1 describes an example of a case where the electric current detectors 76V and 76W are each a digital electric current detector. In this case, the electric current detecting signals are each, for example, a serial data signal (digital data). The second FB signal obtaining section 115 obtains, from the respective electric current detectors 76V and 76W, the electric current detecting signals each serving as a second FB signal. The second FB signal obtaining section 115 communicates with (receives data from) each of the electric current detectors 76V and 76W in a second communication mode. As in the case of the first communication mode, the second communication mode can also be a publicly known serial communication mode. The second FB signal obtaining section 115 thus configured carries out a digital process for obtaining the second FB signal.

The first FB signal obtaining section 110 is connected to each of the network communication section 120 and the PWM signal output section 130. The first FB signal obtaining section 110 can supply the first FB signal to at least one of the network communication section 120 and the PWM signal output section 130. Similarly, the second FB signal obtaining section 115 is connected to each of the network communication section 120 and the PWM signal output section 130. The second FB signal obtaining section 115 can supply the second FB signal to at least one of the network communication section 120 and the PWM signal output section 130. The FB signal obtaining section thus can supply the FB signal to at least one of the network communication section 120 and the PWM signal output section 130.

As described earlier, a communication mode in which the FB signal obtaining section and the detection section communicate with each other can be changed by reconfiguring the reconfigurable device of the FB signal obtaining section.

According to Embodiment 1, the first FB signal obtaining section 110 and the second FB signal obtaining section 115 include respective separate reconfigurable devices. The reconfigurable device of the first FB signal obtaining section 110 and the reconfigurable device of the second FB signal obtaining section 115 are hereinafter referred to as a first reconfigurable device and a second reconfigurable device, respectively. The first communication mode can be changed by reconfiguring a first reconfigured device. Similarly, the second communication mode can be changed by reconfiguring a second reconfigured device.

For example, the FB signal obtaining section includes, as the reconfigurable device, a programmable logic device (PLD) whose circuit configuration can be changed (rewritten). The communication mode of the FB signal obtaining section can be changed by changing the circuit configuration of the PLD. According to Embodiment 1, the first FB signal obtaining section 110 and the second FB signal obtaining section 115 include respective separate PLDs. The PLD of the first FB signal obtaining section 110 and the PLD of the second FB signal obtaining section 115 are hereinafter referred to as a first PLD and a second PLD, respectively. The first communication mode can be changed by changing a circuit configuration of the first PLD. Similarly, the second communication mode can be changed by changing a circuit configuration of the second PLD. The first PLD and the second PLD are thus examples of the first reconfigurable device and the second reconfigurable device, respectively. A change in circuit configuration of each of the PLDs is an example of reconfiguration of each of the reconfigurable devices.

Examples of a PLD include a field programmable gate array (FPGA). Embodiment 1 describes an example of a case where the FB signal obtaining section (each of the first FB signal obtaining section 110 and the second FB signal obtaining section 115) is configured with use of an FPGA. Note, however, that a reconfigurable device that is applicable to the FB signal obtaining section is not limited to an FPGA. The FB signal obtaining section can be alternatively configured with use of, for example, a dynamically reconfigurable processor (DRP).

The network communication section 120 is a communication interface between the control section 10 (at least one slave device 90) and the PLC 100 (master device). The network communication section 120 communicates with the PLC 100 (transmit/receive data to/from the PLC 100) in a third communication mode. The third communication mode is a communication mode different from each of the first communication mode and the second communication mode. Examples of the third communication mode include Ethernet (Registered Trademark) for control automation technology (EtherCAT (Registered Trademark)) and MECHATROLINK (Registered Trademark). The third communication mode can be a publicly known communication mode conforming to a field network.

According to Embodiment 1, the network communication section 120 supplies, to the PLC 100, the first FB signal obtained from the first FB signal obtaining section 110. The network communication section 120 supplies, to the PLC 100, the second FB signal obtained from the second FB signal obtaining section 115.

In accordance with an operation condition of the motor 74 which operation condition is set by the user, the PLC 100 generates one or more command signals with respect to the motor 74 (e.g., calculates one or more command values with respect to the motor 74). For example, the PLC 100 generates a first command value (command value for a rotation angle of the motor 74) and a second command value (command value for an electric current supplied to the motor 74). The PLC 100 uses, as a feedback value (first FB value) with respect to the first command value, Om indicated by the first FB signal. The PLC 100 also uses, as a feedback value (second FB value) with respect to the second command value, a value of an electric current which value is indicated by the second FB signal.

In accordance with a result of comparison between each of the command values and a corresponding FB value (e.g., a difference between each of the command values and a corresponding FB value), the PLC 100 carries out a process (motor control process) for controlling the motor 74. That is, in accordance with the result of comparison, the PLC 100 carries out feedback processing (FB processing) for controlling the motor 74. The PLC 100 thus can carry out the motor control process (FB processing) in accordance with each of the FB signals. For example, according to Embodiment 1, the PLC 100 supplies a result of the FB processing (hereinafter referred to as an "FB processing result") to the PWM signal output section 130 via the network communication section 120. The PWM signal output section 130 generates the PWM signal (motor driving signal) in accordance with the FB processing result. Note, however, that the PLC 100 can alternatively generate the PWM signal.

The PWM signal is a signal for controlling ON/OFF of each of the six switching elements 730 of the inverter 73. The PWM signal can also be understood as a signal for driving the motor 74 via the inverter 73. The PWM signal is thus an example of the motor driving signal (signal for causing the inverter 73 to drive the motor 74). For example, the PWM signal output section 130 adjusts a duty ratio (also referred to as a "duty cycle") of the PWM signal in accordance with the FB processing result.

Unlike the example described earlier, it is possible to provide the control section 10 with an FB processing function. That is, the at least one slave device 90 can be caused to carry out substantial motor control.

(Example of Change in First Communication Mode with Use of Setting Device 900)

For example, in serial communication, format in which data is supplied from a detection section can vary in accordance with a specification of the detection section. Thus, a type of communication mode in which for the FB signal obtaining section to obtain data (the FB signal) from a detection section can vary in accordance with a specification of the detection section. For example, a type of communication mode in which for the first FB signal obtaining section 110 to obtain data (the first FB signal) from the encoder 75 (first communication mode) can vary in accordance with a specification of the encoder 75.

Assume, for example, a case where a certain encoder (for convenience, referred to as "an encoder of a type A") and another encoder (for convenience, referred to as "an encoder of a type B") differ in manufacturer. In such a case, (i) a communication mode in which for the first FB signal obtaining section 110 to obtain data from the encoder of the type A (hereinafter referred to as "the first communication mode of the type A") and (ii) a communication mode in which for the first FB signal obtaining section 110 to obtain data from the encoder of the type B (hereinafter referred to as "the first communication mode of the type B") can differ. For example, the first communication mode of the type A and the first communication mode of the type B are each RS422 but differ in communication protocol.

According to a conventional technique, it is necessary to prepare, in accordance with a specification of an encoder, a motor control device for which a single specific communication mode is set in advance. For example, in order to use an encoder of the type A and a motor control device in combination, it is necessary to prepare a motor control device including a first FB signal obtaining section that can carry out communication in the first communication mode of the type A (hereinafter referred to as "the first FB signal obtaining section of the type A"). In contrast, in order to use an encoder of the type B and a motor control device in combination, it is necessary to prepare a motor control device including a first FB signal obtaining section that can carry out communication in the first communication mode of the type B (hereinafter referred to as "the first FB signal obtaining section of the type B"). According to a conventional technique, a plurality of motor control devices need to be prepared so as to be adaptable to encoders that differ in specification. This unfortunately makes inventory control of motor control devices complicated.

Furthermore, according to a conventional technique, a single motor control device needs to include a plurality of first FB signal obtaining sections so as to be adaptable to encoders that differ in specification. Assume, for example, a case where a single motor control device is adaptable to both an encoder of the type A and an encoder of the type B. In this case, a single motor control device needs to include two first FB signal obtaining sections, which are a first FB signal obtaining section of the type A and a first FB signal obtaining section of the type B. As described above, a single motor control device that is adaptable to encoders that differ in specification unfortunately causes a motor control device to have a complicated configuration.

In view of the above, the inventor of the present application (hereinafter referred to as "the inventor") considered that it leaves much to be improved how to configure a motor control device so that the motor control device can be more convenient. The configuration of the setting device 900 and the at least one slave device 90 of Embodiment 1 is an example of an invention newly attained by the inventor.

For example, the setting device 900 stores therein a program for causing the user to set an operation condition for the at least one slave device 90 (hereinafter referred to as "a setting program"). The setting section 902 and the set data generating section 903 are achieved in a case where the setting device 900 executes the setting program. The setting device 900 is, for example, a portable information processing device. For example, the setting device 900 is a laptop personal computer (PC). Alternatively, the setting device 900 can be a tablet terminal. In a case where a portable information processing device is used as the setting device 900, the user can easily and conveniently change a setting of the at least one slave device 90 on site. Note, however, that the setting device 900 can alternatively be a desktop information processing device.

As described earlier, the setting device 900 can communicate with the at least one slave device 90 (setting communication section 140) through another communication path different from the communication network. Embodiment 1 describes an example of a case where a wired communication path is formed between the setting device 900 and the at least one slave device 90 with use of a universal serial bus (USB) (Registered Trademark) cable. Such a configuration can be employed by providing the at least one slave device 90 with a USB port through which to insert the USB cable. Note, however, that the wired communication path can be alternatively formed with use of a publicly known wired communication technique different from a USB.

Alternatively, a wireless communication path can be formed between the setting device 900 and the at least one slave device 90 with use of, for example, a publicly known wireless communication technique. Such a configuration can be employed by providing the at least one slave device 90 with a wireless communication function that allows the at least one slave device 90 to wirelessly communicate with the setting device 900. For example, a wireless communication path can be formed with use of Bluetooth (Registered Trademark).

During execution of the setting program, the setting device 900 causes a display section (not illustrated) to display a plurality of candidate types of the first communication mode. That is, the setting device 900 presents an operation screen for causing the user to select one of the plurality of types of the first communication mode. The user refers to the operation screen so as to subject the input section 901 to the user operation to select one of the plurality of types of the first communication mode.

The setting section 902 sets one of the plurality of types of the first communication mode in accordance with the user operation. For example, in a case where the user selects the first communication mode of the type A in the operation screen, the setting section 902 sets the first communication mode of the type A out of the plurality of types of the first communication mode in accordance with the selection by the user. In contrast, in a case where the user selects the first communication mode of the type B in the operation screen, the setting section 902 sets the first communication mode of the type B out of the plurality of types of the first communication mode in accordance with the selection by the user.

The set data generating section 903 generates set data of the circuit configuration of the first PLD (hereinafter referred to as "first set data"). The first set data and second set data (described later) are each an example of set data of the reconfigurable device. Specifically, the set data generating section 903 generates the first set data in accordance with a type of the first communication mode which type has been set by the setting section 902. Then, the set data generating section 903 supplies, to the setting communication section 140, the first set data thus generated. The set data (first set data and second set data (described later)) is an example of communication mode information. The setting communication section 140 can change the circuit configuration of the PLD in accordance with the communication mode information.

For example, in a case where the first communication mode of the type A is set as the first communication mode, the set data generating section 903 generates the first set data (hereinafter referred to as "the first set data of the type A") so that the first FB signal obtaining section 110 can carry out communication in the first communication mode of the type A. Then, the set data generating section 903 supplies the first set data of the type A to the setting communication section 140 via the USB cable. Subsequently, the setting communication section 140 changes the circuit configuration of the first PLD with use of the first set data of the type A. This allows the first FB signal obtaining section 110 to carry out communication in the first communication mode of the type A.

In contrast, in a case where the first communication mode of the type B is set as the first communication mode, the set data generating section 903 generates the first set data (hereinafter referred to as "the first set data of the type B") so that the first FB signal obtaining section 110 can carry out communication in the first communication mode of the type B. Then, the set data generating section 903 supplies the first set data of the type B to the setting communication section 140 via the USB cable. Subsequently, the setting communication section 140 changes the circuit configuration of the first PLD with use of the first set data of the type B. This allows the first FB signal obtaining section 110 to carry out communication in the first communication mode of the type B.

As described earlier, according to the setting device 900, it is possible to provide the first FB signal obtaining section 110 with a function of either the first FB signal obtaining section of the type A or the first FB signal obtaining section of the type B in accordance with a specification of the encoder. That is, it is possible to change a protocol of the first communication mode in the first FB signal obtaining section 110. Specifically, without the need to provide any additional first FB signal obtaining section, it is possible to cause a single slave device 90 to communicate with encoders that vary in specification. Thus, unlike a conventional technique, it is possible to make inventory control of the at least one slave device 90 less complicated. In addition, it is also possible to prevent the configuration of the at least one slave device 90 from being more complicated. As described earlier, as compared with a conventional configuration, the configuration of Embodiment 1 allows the at least one slave device 90 to be more convenient.

(Example of Change in Second Communication Mode with Use of Setting Device 900)

As in the case of the example described earlier, a type of communication mode in which for the second FB signal obtaining section 115 to obtain data (the second FB signal) from each of the electric current detectors 76V and 76W (second communication mode) can also vary in accordance with a specification of the electric current detectors 76V and 76W. In view of the above, the setting device 900 can be configured to change the second communication mode as in the case of the first communication mode. The following description discusses an example of two types of communication modes, which are the second communication mode of the type A and the second communication mode of the type B. The second communication mode of the type A can be identical to or different from the first communication mode of the type A. Similarly, the second communication mode of the type B can be identical to or different from the first communication mode of the type B.

The setting section 902 sets one of a plurality of types of the second communication mode in accordance with the user operation. The set data generating section 903 generates set data of the circuit configuration of the second PLD (hereinafter referred to as "second set data"). Specifically, the set data generating section 903 generates the second set data in accordance with a type of the second communication mode which type has been set by the setting section 902. Then, the set data generating section 903 supplies, to the setting communication section 140, the second set data thus generated. The setting communication section 140 can change the circuit configuration of the second PLD in accordance with the communication mode information.

For example, in a case where the second communication mode of the type A is set as the second communication mode, the set data generating section 903 generates the second set data (hereinafter referred to as "the second set data of the type A") so that the second FB signal obtaining section 115 can carry out communication in the second communication mode of the type A. Then, the set data generating section 903 supplies the second set data of the type A to the setting communication section 140 via the USB cable. Subsequently, the setting communication section 140 changes the circuit configuration of the second PLD with use of the second set data of the type A. This allows the second FB signal obtaining section 115 to carry out communication in the second communication mode of the type A.

In contrast, in a case where the second communication mode of the type B is set as the second communication mode, the set data generating section 903 generates the second set data (hereinafter referred to as "the second set data of the type B") so that the second FB signal obtaining section 115 can carry out communication in the second communication mode of the type B. Then, the set data generating section 903 supplies the second set data of the type B to the setting communication section 140 via the USB cable. Subsequently, the second FB signal obtaining section 115 changes the circuit configuration of the second PLD with use of the second set data of the type B. This allows the second FB signal obtaining section 115 to carry out communication in the second communication mode of the type B.

As described earlier, according to the setting device 900, it is possible to provide the second FB signal obtaining section 115 with a function of either the second FB signal obtaining section of the type A (the second FB signal obtaining section that can carry out communication in the second communication mode of the type A) or the second FB signal obtaining section of the type B (the second FB signal obtaining section that can carry out communication in the second communication mode of the type B) in accordance with a specification of an electric current detector. That is, the second FB signal obtaining section 115 can change a protocol of the second communication mode. Specifically, it is also possible to cause a single slave device 90 to communicate with electric current detectors that vary in specification.

Furthermore, the setting device 900 can communicate with the at least one slave device 90 through another communication path (e.g., the USB cable) different from the communication network in the FA system 1. That is, a relationship in which the setting device 900 and the at least one slave device 90 are connected can be easily changed without the need to set the communication network in the FA system 1. This makes it possible to connect the setting device 900 and the at least one slave device 90 without the need to cause the user to carry out a complicated operation. This allows the user to easily and conveniently set the at least one slave device 90 at a site where the at least one slave device 90 is provided.

In particular, according to Embodiment 1, the set data generating section 903 can generate the first set data and the second set data. This makes it possible to cope with a complicated change in circuit configuration of each of the first PLD and the second PLD. Thus, it is possible to provide the user with a wider variety of options for a settable type of each of the first communication mode and the second communication mode. Furthermore, since it is possible to directly supply set data from the setting device 900 to the at least one slave device 90 via the USB cable, it is possible to simplify an operation of the user.

[Variation]

Figure 4:
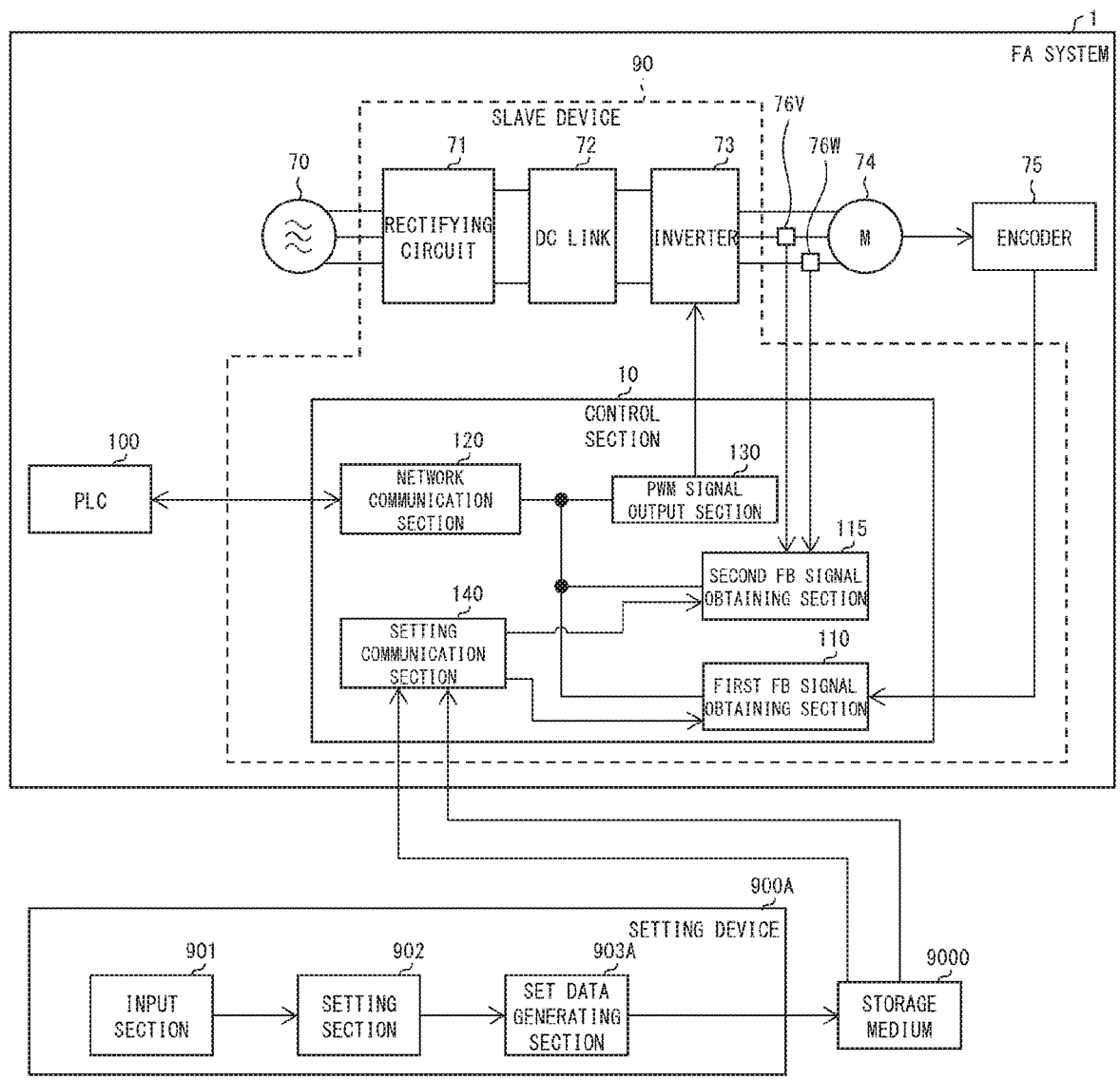
FIG. 4 is a view illustrating a configuration of a main part of an FA system and a setting device in accordance with a variation of Embodiment 1.

FIG. 4 is a view illustrating a configuration of a main part of an FA system 1 and a setting device 900A. The setting device 900A is a variation of the setting device 900 of Embodiment 1. The setting device 900A includes a set data generating section that is referred to as a set data generating section 903A (generating section). Unlike the set data generating section 903, the set data generating section 903A further has a function of supplying, to a storage medium 9000, first set data and second set data each generated by the set data generating section 903A. That is, the set data generating section 903A can write each of the first set data and the second set data to the storage medium 9000.

The storage medium 9000 is any storage medium that is readable by a slave device 90. The storage medium 9000 is, for example, removable media that is removable from both the setting device 900A and the slave device 90. Examples of the removable media include a USB memory and an SD memory card. For example, the following description discusses a case where a USB memory is used as the storage medium 9000.

A user inserts the storage medium 9000 through a USB port provided in the setting device 900A. The insertion of the storage medium 9000 through the USB port of the setting device 900A triggers the set data generating section 903A to write the first set data and the second set data to the storage medium 9000. In a case where writing of the first set data and the second set data is finished, the user draws out the storage medium 9000 through the USB port of the setting device 900A.

Subsequently, the user inserts the storage medium 9000 through a USB port provided in the slave device 90. The insertion of the storage medium 9000 through the USB port of the slave device 90 triggers a setting communication section 140 to read the first set data and the second set data each stored in the storage medium 9000. An FB signal obtaining section uses the first set data and the second set data to change respective circuit configurations of PLDs.

As described earlier, the setting communication section 140 can receive communication mode information by reading information recorded in the storage medium 9000. This makes it unnecessary to prepare the setting device 900A in changing the respective circuit configurations of the PLDs.

Embodiment 2

The following description discusses Embodiment 2. Note that, for convenience, members having functions identical to those of the respective members described in Embodiment 1 are given respective identical reference signs, and a description of those members is omitted here. An FA system of Embodiment 2 is referred to as an FA system 2. A setting device of Embodiment 2 is referred to as a setting device 900B.

Figure 5:
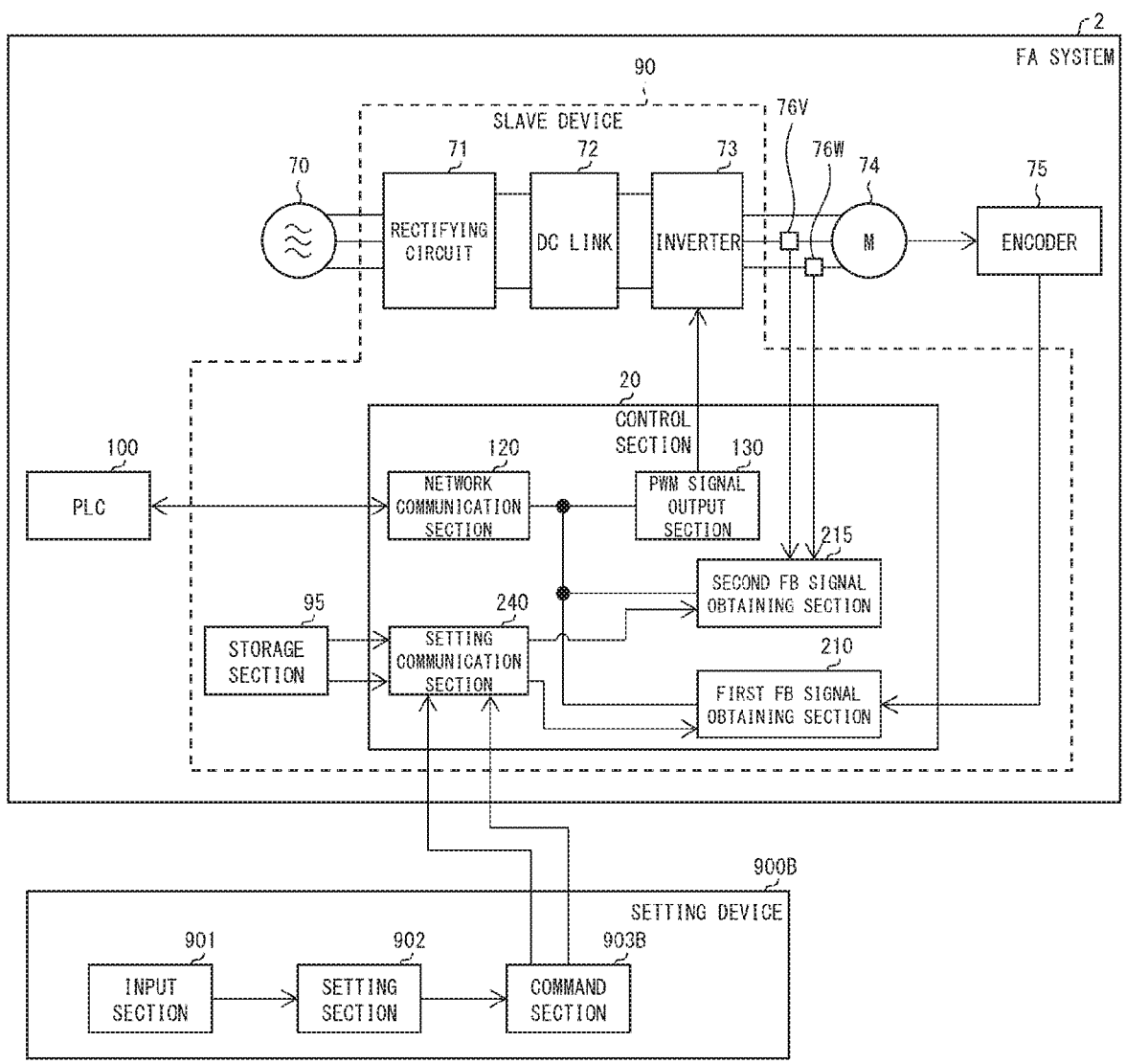
FIG. 5 is a view illustrating a configuration of a main part of an FA system and a setting device of Embodiment 2.

FIG. 5 is a view illustrating a configuration of a main part of the FA system 2 and the setting device 900B. The FA system 2 includes a slave device 90 including a control section that is referred to as a control section 20. The control section 20 includes a first FB control section and a second FB control section that are referred to as a first FB control section 210 (first feedback signal obtaining section) and a second FB control section 215 (second feedback signal obtaining section), respectively. The control section 20 also includes a setting communication section that is referred to as a setting communication section 240.

Unlike Embodiment 1, set data of a circuit configuration of a PLD is retained in the slave device 90 in advance. The slave device 90 further includes a storage section 95. The storage section 95 stores therein, in advance, first set data of a type A, first set data of a type B, second set data of the type A, and second set data of the type B.

(Example of Change in First Communication Mode with Use of Setting Device 900B)

The setting device 900B is obtained by replacing the set data generating section 903 with a command section 903B in the setting device 900 of Embodiment 1. The command section 903B gives, to the setting communication section 240, a command (hereinafter referred to as a "setting command") to set (change) respective circuit configurations of PLDs with use of the set data stored in the storage section 95. According to Embodiment 2, the setting command is an example of communication mode information. Specifically, the setting communication section 240 receives the setting command in a form of communication mode information.

For example, in a case where a first communication mode of the type A is set as the first communication mode, the command section 903B uses the first set data of the type A to give, to the setting communication section 240, a command to set a circuit configuration of a first PLD (hereinafter referred to as "a first setting command of the type A"). Upon receiving the first setting command of the type A, the setting communication section 240 reads the first set data of the type A from the storage section 95. Subsequently, the setting communication section 240 changes the circuit configuration of the first PLD with use of the first set data of the type A. This allows the first FB signal obtaining section 210 to carry out the first communication mode of the type A.

In contrast, in a case where the first communication mode of the type B is set as the first communication mode, the command section 903B uses the first set data of the type B to give, to the setting communication section 240, a command to set the circuit configuration of the first PLD (hereinafter referred to as "a first setting command of the type B"). Upon receiving the first setting command of the type B, the setting communication section 240 reads the first set data of the type B from the storage section 95. Subsequently, the setting communication section 240 changes the circuit configuration of the first PLD with use of the first set data of the type B. This allows the first FB signal obtaining section 210 to carry out the first communication mode of the type B.

(Example of Change in Second Communication Mode with Use of Setting Device 900B)

For example, in a case where a second communication mode of the type A is set as the second communication mode, the command section 903B uses the second set data of the type A to give, to the setting communication section 240, a command to set a circuit configuration of a second PLD (hereinafter referred to as "a second setting command of the type A"). Upon receiving the second setting command of the type A, the setting communication section 240 reads the second set data of the type A from the storage section 95. Subsequently, the setting communication section 240 changes the circuit configuration of the second PLD with use of the second set data of the type A. This allows the second FB signal obtaining section 215 to carry out the second communication mode of the type A.

In contrast, in a case where the second communication mode of the type B is set as the second communication mode, the command section 903B uses the second set data of the type B to give, to the setting communication section 240, a command to set the circuit configuration of the second PLD (hereinafter referred to as "a second setting command of the type B"). Upon receiving the second setting command of the type B, the setting communication section 240 reads the second set data of the type B from the storage section 95. Subsequently, the setting communication section 240 changes the circuit configuration of the second PLD with use of the second set data of the type B. This allows the second FB signal obtaining section 215 to carry out the second communication mode of the type B.

The configuration of Embodiment 2 also makes it possible to change the circuit configuration of each of the first PLD and the second PLD in accordance with each of the first communication mode and the second communication mode each set by a user. This allows the slave device to be more convenient. In particular, unlike Embodiment 1, Embodiment 2 makes it unnecessary to cause the setting device to generate the set data. This makes it possible to simplify a process carried out by the setting device.

[Variation]

In a setting device in accordance with an aspect of the present invention, a communication mode of an FB signal obtaining section can be changed with use of a publicly known hardware switch. Specifically, a hardware switch can be used as another communication path different from a communication network. Examples of the hardware switch include a dual in-line package (DIP) switch. As in the case of Embodiment 2, a motor control device is assumed to include a storage section in which set data of respective circuit configurations of PLDs is retained in advance. The following description discusses an example of a first FB signal obtaining section. A second FB signal obtaining section, a description of which is omitted here, is similar to the first FB signal obtaining section.

For example, turning-on, by a user, of a single predetermined switch in a DIP switch (e.g., a switch for a first communication mode of a type A) triggers the DIP switch to give a first setting command of the type A to a network communication section. In this case, it is possible to cause the first FB signal obtaining section to carry out a first communication mode of the type A. In contrast, (i) turning-off, by the user, of the single predetermined switch and (ii) turning-on, by the user, of another switch in the DIP switch (e.g., a switch for the first communication mode of a type B) trigger the DIP switch to give the first setting command of the type B to the first FB signal obtaining section. In this case, it is possible to cause the first FB signal obtaining section to carry out the first communication mode of the type B.

[Software Implementation Example]

Control blocks of the FA systems 1 and 2, and the setting devices 900, 900A, and 900B (particularly, the control sections 10 and 20, the setting section 902, the set data generating sections 903 and 903A, and the command section 903B) can be realized by a logic circuit (hardware) provided in an integrated circuit (IC chip) or the like or can be alternatively realized by software.

In the latter case, the FA systems 1 and 2, and the setting devices 900, 900A, and 900B each include a computer that executes instructions of a program that is software realizing the foregoing functions. The computer, for example, includes at least one processor and a computer-readable storage medium storing the program. An object of an aspect of the present invention can be achieved by the processor of the computer reading and executing the program stored in the storage medium. Examples of the processor encompass a central processing unit (CPU). Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

[Supplemental Remarks]

An aspect of the present invention is not limited to the embodiments, but can be altered by a skilled person in the art within the scope of the claims. An aspect of the present invention also encompasses, in its technical scope, any embodiment derived by combining technical means disclosed in differing embodiments.

Aspects of the present invention can also be expressed as follows:

As described earlier, a motor control device in accordance with an aspect of the present invention is a motor control device for controlling a motor, the motor control device including: a network communication section configured to communicate, via a communication network, with a master device, which is a host device with respect to the motor control device; a feedback signal obtaining section configured to obtain, from a detection section configured to detect a predetermined physical quantity corresponding to an operating state of the motor, a feedback signal indicative of the predetermined physical quantity; and a setting communication section configured to receive communication mode information of the feedback signal obtaining section through another communication path different from the communication network, the feedback signal obtaining section including a reconfigurable device and being capable of changing a communication mode of the feedback signal obtaining section by reconfiguring the reconfigurable device, and the motor control device reconfiguring the reconfigurable device in accordance with the communication mode information in a case where the setting communication section receives the communication mode information.

The configuration allows a suitable communication mode of the motor control device to be freely changed in accordance with a specification of the detection section. That is, unlike a conventional technique, the configuration makes it unnecessary to prepare, in accordance with, for example, a specification of the detection section, the motor control device for which a single specific communication mode is set in advance. Thus, a single motor control device can be set so as to communicate with detection sections that vary in specification.

Furthermore, the setting communication section can receive the communication mode information through another communication path different from the communication network (e.g., a communication network in an FA system). For example, the setting communication section can communicate with a setting device (device for setting an operation condition of the motor control device) through the another communication path. This makes it possible to easily change a relationship in which the motor control device and the setting device are connected. This allows a user to easily and conveniently set the motor control device at a site (e.g., in a factory) where the motor control device is provided. As described earlier, according to an aspect of the present invention, a communication mode in which to communicate with the detection section can be easily and conveniently changed in the motor control device. This allows the motor control device to be more convenient.

In order to attain the object, the motor control device in accordance with an aspect of the present invention can be configured such that: the setting communication section receives the communication mode information which is set data of the reconfigurable device; and the motor control device reconfigures the reconfigurable device in accordance with the set data.

The configuration allows the reconfigurable device to be reconfigured in accordance with set data set by, for example, a setting device. In particular, generation of the set data by the setting device also allows complicated reconfiguration of the reconfigurable device. Thus, it is possible to provide the user with a wider variety of options for a settable type of the communication mode. Furthermore, since it is possible to directly supply the set data from the setting device to the motor control device via the communication path, it is possible to simplify an operation of the user.

In order to attain the object, the motor control device in accordance with an aspect of the present invention can be configured such that the setting communication section receives the communication mode information by reading information recorded in a storage medium.

By causing the motor control device to read the information recorded in the storage medium, the configuration also allows the motor control device to obtain the communication mode information. This makes it unnecessary to prepare a setting device in reconfiguring the reconfigurable device.

In order to attain the object, the motor control device in accordance with an aspect of the present invention can be configured such that: set data of the reconfigurable device is retained in the motor control device in advance; and the setting communication section receives the communication mode information which is a command to reconfigure the reconfigurable device with use of the set data.

The configuration also allows the reconfigurable device to be reconfigured. In this case, it is unnecessary to cause a setting device to generate the set data. This makes it possible to simplify a process carried out by the setting device.

In order to attain the object, the motor control device in accordance with an aspect of the present invention can be configured such that: the detection section includes a first detection section configured to detect a position of a rotor of the motor; the feedback signal includes a first feedback signal indicative of the position of the rotor of the motor; and the feedback signal obtaining section includes a first feedback signal obtaining section configured to obtain the first feedback signal from the first detection section.

The configuration makes it possible to easily and conveniently change a communication mode in which for the first feedback signal obtaining section to communicate with the first detection section (e.g., an encoder). Thus, a single motor control device can be set so as to communicate with encoders that vary in specification.

In order to attain the object, the motor control device in accordance with an aspect of the present invention can be configured such that: the detection section includes a second detection section configured to detect an electric current supplied from the motor control device to the motor; the feedback signal includes a second feedback signal indicative of the electric current; and the feedback signal obtaining section includes a second feedback signal obtaining section configured to obtain the second feedback signal from the second detection section.

The configuration makes it possible to easily and conveniently change a communication mode in which for the second feedback signal obtaining section to communicate with the second detection section (e.g., an electric current detector). Thus, a single motor control device can be set so as to communicate with electric current detectors that vary in specification.

In order to attain the object, a setting device in accordance with an aspect of the present invention is a setting device for setting an operation condition of a motor control device, the motor control device including: a network communication section configured to communicate, via a communication network, with a master device, which is a host device with respect to the motor control device; and a feedback signal obtaining section configured to obtain, from a detection section configured to detect a predetermined physical quantity corresponding to an operating state of a motor, a feedback signal indicative of the predetermined physical quantity, the feedback signal obtaining section including a reconfigurable device and being capable of changing a communication mode of the feedback signal obtaining section by reconfiguring the reconfigurable device, the setting device including: a setting section configured to set communication mode information of the feedback signal obtaining section, the setting device supplying the communication mode information to the motor control device through another communication path different from the communication network.

The configuration also allows a communication mode in which to communicate with a detection section to be easily and conveniently changed in a motor control device.

REFERENCE SIGNS LIST

74 Motor
75 Encoder (detection section, first detection section)
76V, 76W Electric current detector (detection section, second detection section)
90, 90a-90c, Slave device (motor control device)
100 PLC (master device)
110, 210 First FB signal obtaining section (feedback signal obtaining section, first feedback signal obtaining section)
115, 215 Second FB signal obtaining section (feedback signal obtaining section, second feedback signal obtaining section)
120 Network communication section
140, 240 Setting communication section
900, 900A, 900B Setting device
902 Setting section
9000 Storage medium

The invention claimed is:

1. A motor control device for controlling a motor, said motor control device comprising:
a network communication section configured to communicate, via a communication network, with a master device, which is a host device with respect to the motor control device;
a feedback signal obtaining section configured to obtain, from a detection section configured to detect a predetermined physical quantity corresponding to an operating state of the motor, a feedback signal indicative of the predetermined physical quantity; and
a setting communication section configured to receive communication mode information of the feedback signal obtaining section through another communication path different from the communication network,
the feedback signal obtaining section including a reconfigurable device and changing a communication mode of the feedback signal obtaining section by reconfiguring the reconfigurable device, and
the motor control device reconfiguring the reconfigurable device in accordance with the communication mode information in a case where the setting communication section receives the communication mode information.

2. The motor control device as set forth in claim 1, wherein:
the setting communication section receives the communication mode information which is set data of the reconfigurable device; and
the motor control device reconfigures the reconfigurable device in accordance with the set data.

3. The motor control device as set forth in claim 1, wherein the setting communication section receives the communication mode information by reading information recorded in a storage medium.

4. The motor control device as set forth in claim 1, wherein:
set data of the reconfigurable device is retained in the motor control device in advance; and
the setting communication section receives the communication mode information which is a command to reconfigure the reconfigurable device with use of the set data.

5. The motor control device as set forth in claim 1, wherein:
the detection section includes a first detection section configured to detect a position of a rotor of the motor;
the feedback signal includes a first feedback signal indicative of the position of the rotor of the motor; and
the feedback signal obtaining section includes a first feedback signal obtaining section configured to obtain the first feedback signal from the first detection section.

6. The motor control device as set forth in claim 1, wherein:
the detection section includes a second detection section configured to detect an electric current supplied from the motor control device to the motor;
the feedback signal includes a second feedback signal indicative of the electric current; and
the feedback signal obtaining section includes a second feedback signal obtaining section configured to obtain the second feedback signal from the second detection section.

7. A setting device for setting an operation condition of a motor control device,
the motor control device including:
a network communication section configured to communicate, via a communication network, with a master device, which is a host device with respect to the motor control device; and
a feedback signal obtaining section configured to obtain, from a detection section configured to detect a predetermined physical quantity corresponding to an operating state of a motor, a feedback signal indicative of the predetermined physical quantity,
the feedback signal obtaining section including a reconfigurable device and changing a communication mode of the feedback signal obtaining section by reconfiguring the reconfigurable device,
said setting device comprising:
a setting section configured to set communication mode information of the feedback signal obtaining section,
the setting device supplying the communication mode information to the motor control device through another communication path different from the communication network.

* * * * *